US012571490B1

(12) United States Patent
Arencibia et al.

(10) Patent No.: US 12,571,490 B1
(45) Date of Patent: Mar. 10, 2026

(54) TENSIONING DEVICE FOR FLEXIBLE RIBBED TUBING

(71) Applicant: Unlimited Inventions LLC, Miami, FL (US)

(72) Inventors: Yussen Arencibia, Miami, FL (US);
Javier Riera, Florida City, FL (US)

( * ) Notice: Subject to any disclaimer, the term of this patent is extended or adjusted under 35 U.S.C. 154(b) by 0 days.

(21) Appl. No.: 18/787,050

(22) Filed: Jul. 29, 2024

(51) Int. Cl.
| | |
|---|---|
| *F16L 3/00* | (2006.01) |
| *F16L 3/10* | (2006.01) |
| *F16L 5/00* | (2006.01) |

(52) U.S. Cl.
CPC ............... *F16L 3/1091* (2013.01); *F16L 5/00* (2013.01)

(58) Field of Classification Search
None
See application file for complete search history.

(56) References Cited

U.S. PATENT DOCUMENTS

| | | | | | |
|---|---|---|---|---|---|
| 4,306,698 | A * | 12/1981 | Gonia | ....................... | F16L 3/08 |
| | | | | | 248/74.1 |
| 6,491,067 | B1 * | 12/2002 | Davenport | ........... | H02G 3/0468 |
| | | | | | 138/156 |
| 6,866,302 | B2 * | 3/2005 | Furata | ..................... | F16L 33/01 |
| | | | | | 285/903 |
| 6,922,893 | B2 * | 8/2005 | Ingram | ................... | F16L 33/26 |
| | | | | | 29/890.144 |
| 7,140,648 | B2 * | 11/2006 | Ingram | ............... | F16L 33/2071 |
| | | | | | 29/890.144 |
| 9,303,790 | B2 * | 4/2016 | Kim | .......................... | F16L 3/13 |
| 9,843,177 | B2 * | 12/2017 | Yamamoto | ........ | B29C 45/14065 |

* cited by examiner

*Primary Examiner* — Steven M Marsh
(74) *Attorney, Agent, or Firm* — Sanchelima & Associates, P.A.; Jesus Sanchelima; Christian Sanchelima

(57) ABSTRACT

A tensioning device to secure ribbed or corrugated flexible and stretchable tubing passing through openings in metal structural members to ensure a straight distension of tubing along its path. The inventios is mounted coaxially with respect to the tubing, protective sleeves and orifice in a structural member. The inventios is substantially a flanged cylindrical body with two longitudinal sections to removably embrace tubing. Sections have at least one internal rib and that separate to embrace tubing and are removably engaged to outer channels of tubing. The invention is mounted to tubing while the latter is pulled in one direction with sufficient force for one or more of outer channels to protrude through opening, allowing the engagement of one or more of internal ribs. Once engaged, the pulling force is released, causing the tubing to shrink against to its at-rest configuration with the outer flanges and acting as a stopper.

4 Claims, 7 Drawing Sheets

TENSIONING DEVICE FOR FLEXIBLE RIBBED TUBING

BACKGROUND OF THE INVENTION

1. Field of the Invention

The present invention relates to a tensioning device and, more particularly, to a tensioning device for ribbed flexible tubing passing through openings in metal structures, and more particularly for metal structures commonly used as studs and bases in the construction of walls.

2. Description of the Related Art

Several designs for devices have been designed in the past to protect ribbed (or corrugated) flexible tubing passed through openings in metal structures. When flexible tubing is passed over a long distance it tends to sag or otherwise lose the ideal straight alignment. Passing cables and wires becomes difficult when the flexible tubing is not straight. There are no devices for tensioning flexible tubing in the market of the prior art. And more remote is any suggestion of including a tensioning device mechanism with internal ribs that cooperatively mate with the channels found in flexible ribbed tubing products. The present invention provides a firm grip on the flexible tubing outer ribbed surface. A cooperating flange that acts as a stopper to prevent movement of the tubing.

The closest device to the present invention is a sleeve commonly used to protect tubing from abrasion. This prior art sleeve is represented in the drawings and indicated with the letter "S." However, sleeve "S" is purposely intended to allow the tubing to pass freely through, resulting in sagging tubing or requiring secondary operations to secure the tubing in place.

Applicant believes that a related reference corresponds to U.S. Pat. No. 8,141,831B2 issued for a hanger connector for flexible tubing. The disclosed device requires two parallel brackets, a clamp assembly and other components to support a tubing member. This complicated device will not be able to keep the tubing straight as it passes through metal structural members. Applicant believes that another related reference corresponds to U.S. Pat. No. 752,722B1 issued for a bent support bracket for flexible polymeric tubing. None of these references, however, teach of a tensioning mechanism configured to readily secure flexible ribbed tubing within metal wall apertures and cooperate with mating sleeves. None of the references teach a secure mount to keep the tubing in straight alignment.

In practice, most electricians have to improvise with make-shift contraptions to keep the flexible tubing as straight as possible. This facilitates passing wires and cables inside the flexible tubing, especially for long distances in buildings. Typically, these secondary operations are time consuming and involve using wires to secure the flexible tubing in place. Many of these attempts are not effective in keeping the flexible tubing straight, especially over long distances in high rises and other buildings.

Other documents describing the closest subject matter provide a number of more or less complicated features that fail to solve the problem in an efficient and economical way. None of these patents suggest the novel features of the present invention.

SUMMARY OF THE INVENTION

It is one of the objects of the present invention to provide a device that can be readily used to keep ribbed flexible tubing in straight alignment when passed through openings in metal structures with protective sleeves thereby facilitating passing cables and wires therethrough.

It is another object of this invention to provide a device that protects ribbed flexible tubing providing secure mounting through openings in metal structural members simplifying installation process.

It is still another object of the present invention to provide a device that helps to protect the flexible tubing from fatigue damage or abrasion while being installed.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which:

FIG. 4B shows an alternate embodiment for flexible tensioning device 120 wherein flanges 145 and 145a have each a slice cutout opposite to distal edges 149 and 149a. The dimensions of the slice cutouts are relatively small and sufficient to facilitate bending or separating sections 140 and 140a.

DETAILED DESCRIPTION OF THE EMBODIMENTS OF THE INVENTION

Figure 1:
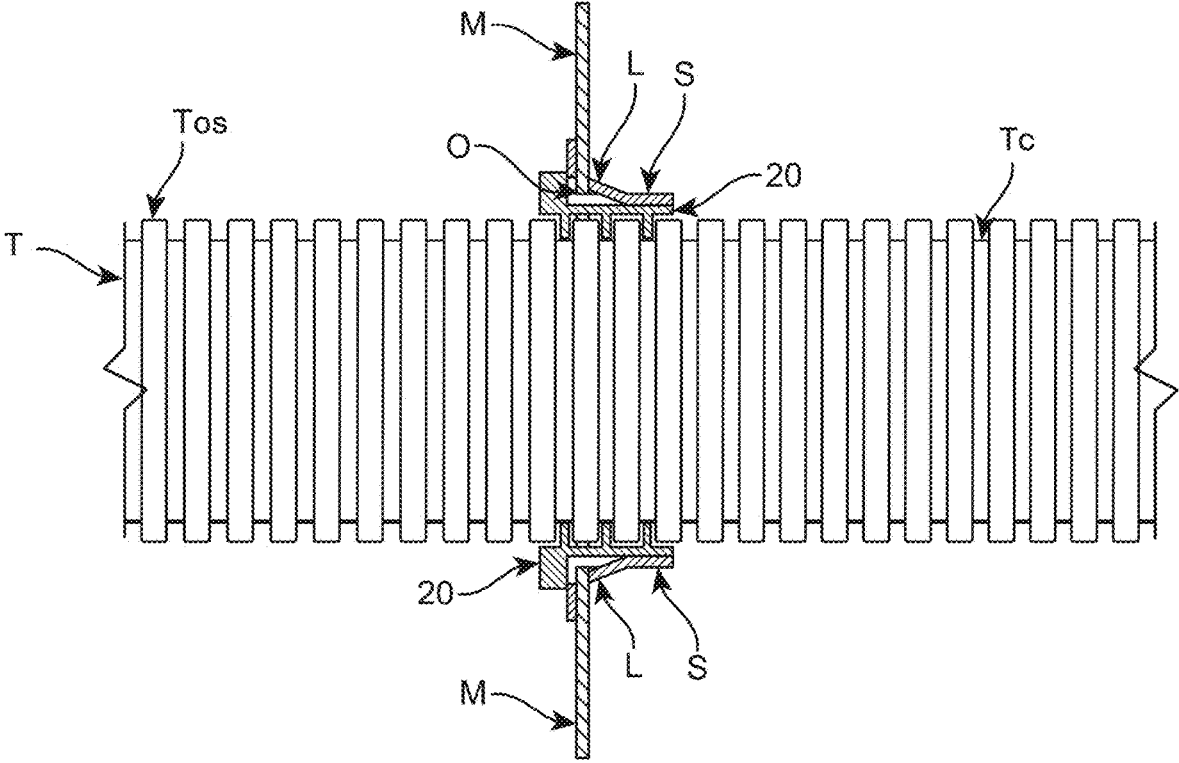
FIG. 1 represents a cross-section view of the present invention 20 installed on a conventional metal structural member (stud) M, engaging the ribbed flexible tubbing T (not in cross-section) passing through protective sleeve S. Sleeve S snaps in lodging the inner edges of opening O inside the latches L.

Referring now to the drawings, where the present invention is generally referred to with numeral 20, it can be observed that it has a substantially cylindrical body 30 composed of two longitudinal and complementary sections 40 and 40*a*. Longitudinal distal edges 49 and 49*a* can be selectively and separated from each other to receive tubing T and, once in coaxially disposition, ends 49 and 49*a* are brought towards each other embracing tubing T. Section 40 includes ends 41 and 43. Flange 45 extends outwardly from end 41. Similarly, section 40*a* includes ends 41*a* and 43*a* with flange 45*a* extending outwardly from end 41*a*. Tensioning device 40 fits coaxially over sleeve S, which is commonly used, to protect ribbed flexible tubing T from the metal edges defining orifice O. Sleeve S typically includes a latch L that coacts with the inner edges that define orifice O to keep it in place.

It should be understood there are modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

In an exemplary embodiment, tensioning device 20 includes identical complementary sections 40; 40*a*. The arcs of sections 40 and 40*a* can be modified, for example, section 40 may have a cross-sectional arc of 170 degrees and section 40*a* may have 190 degrees or less. One of the preferred embodiments does not contemplate a gap between the abutting edges of section 40 and 40*a* when embracing tube T. The objective is to provide a firm grip on the ribbed outer surface of flexible tubing T.

Figure 4:
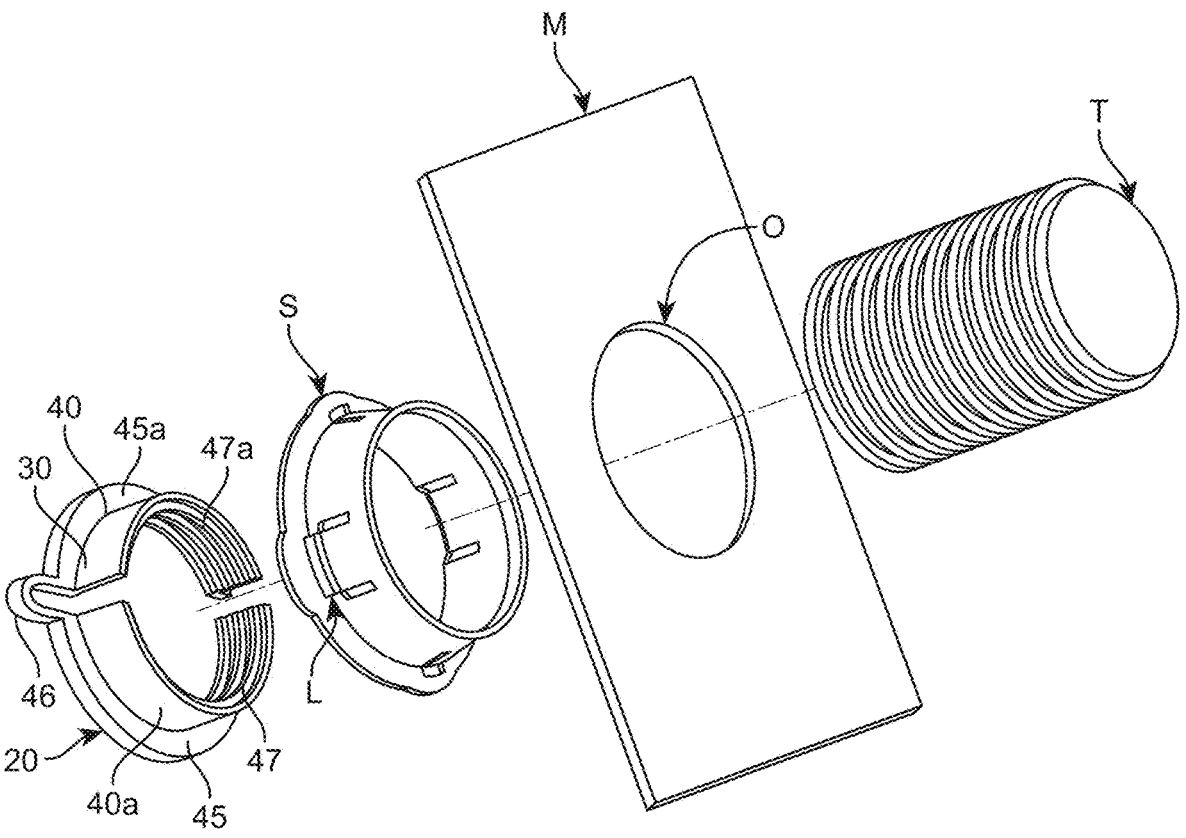
FIG. 4 is a representation of an exploded view showing the coaxial disposition of tensioning device 20 with protective sleeve S and through opening O.
Figure 4A:
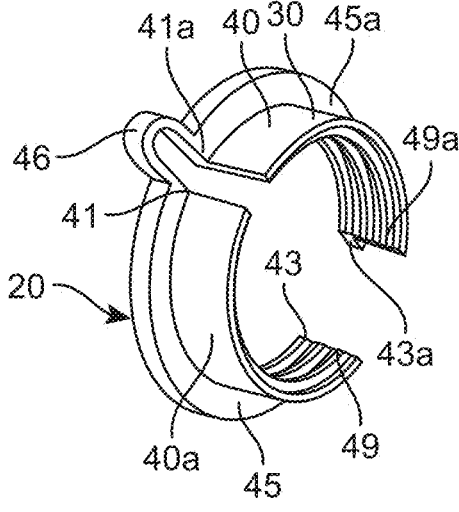
FIG. 4A shows tensioning device flexible 20 in the open disposition with sections 40 and 40a separated and ready to be mounted to ribbed flexible tubing (not shown).
Figure 4B:
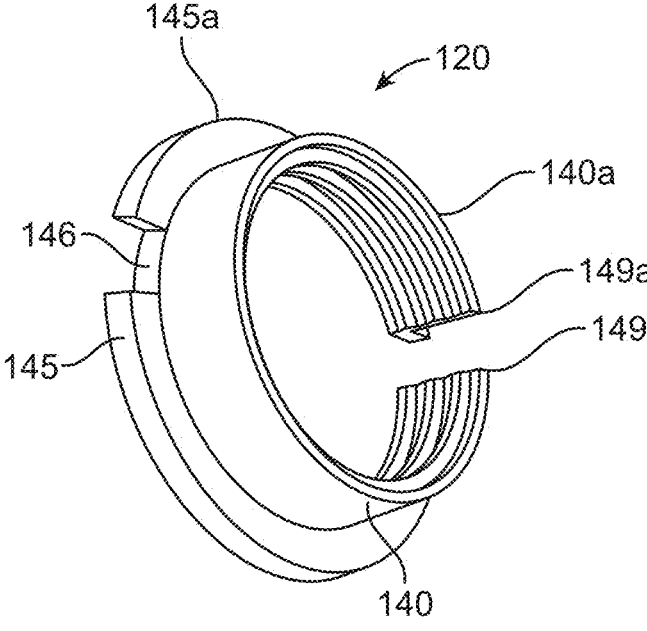

In one of the preferred embodiments, an integral hinge 46 can be provided by with a connecting hinge (or band) 46 joining sections 40 and 40*a*, as seen in FIG. 4A. Another way is debilitating an area between sections 40 and 40*a*. As best seen in FIG. 4B, one way to implement integral hinge 46 is by removing respective portions of flanges 45 and 45*a* between sections 40 and 40*a*. Integral hinge 46 reduces the thickness at a cooperating longitudinal area to facilitate the opening and closing of tensioning device 20. The material to be used or implement device 20 is not rigid or brittle. Rather, the material should be resilient and flexible enough to allow sections 40 and 40*a* to separate and embrace tubing T.

Figure 4C:
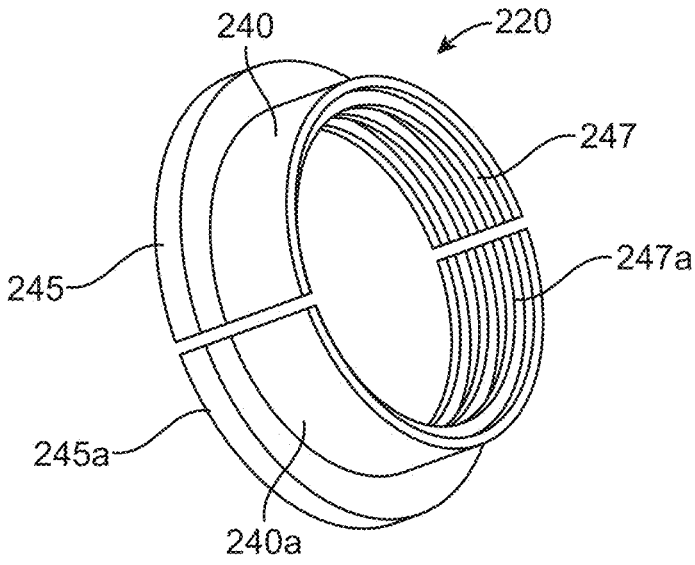
FIG. 4C is yet another alternate embodiment for tensioning device 220 wherein sections 240 and 240a are separate. Sections 240 and 240a require a user to hold sections 240 and 240a against tubing T when the latter is pulled. Once tubing T is released, sections 240 and 240a are housed inside sleeve S.

Yet another embodiment for device 20 is to have separate sections 40 and 40*a*, as seen in FIG. 4C. This embodiment has the mold production advantage of using identical parts.

Figure 5:
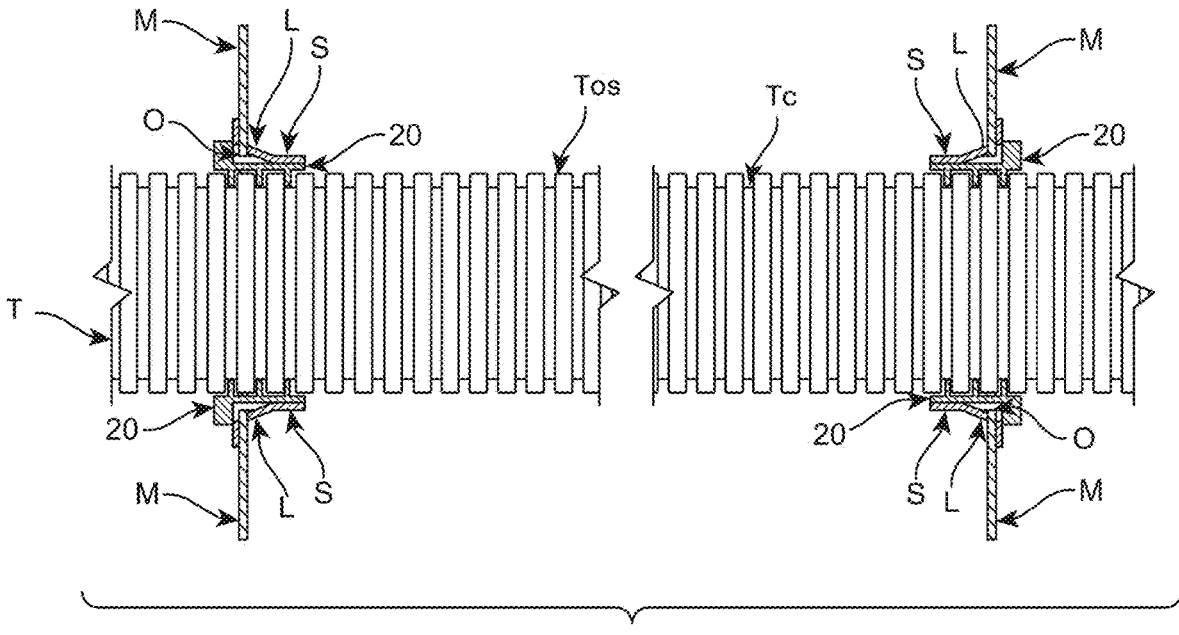
FIG. 5 illustrates the way the tensioning devices are used to keep a routed tubing T from sagging. Devices 20 are shown mounted in opposition disposition thereby preventing the movement of tubing T in both directions.

To install tensioning device 20, sections 40 and 40*a* are separated to embrace tubing T bringing cooperating internal ribs 47 and 47*a* to an engagement disposition with channels Tc interrupting outer surface Tos of tubing T. See FIGS. 1 and 1A. In one of the preferred embodiments, sleeve S has been previously and conventionally mounted to the inner edges of metal structural members M defining opening O. An unnoticed, before this invention, characteristic of ribbed flexible tubing T is that it can be stretched when it is pulled. Tubing T can be pulled a sufficient distance to move one to three channels Tc towards the side applying the pulling force. The inventor used this unnoticed feature of tubing T. In one of the preferred embodiments illustrated, device 20 has three internal ribs, as seen in FIG. 1. Therefore, it is preferable to pull tubing T with sufficient force to expose at least three channels Tc to the side when the pulling force is applied. This pulling force needs to be applied before mounting tensioning device 20 and with sleeve S in place. Tensioning device 20 has edges 49 and 49*a* that resiliently come in abutting relationship with respect to each other engaging channels Tc. Then, device 20 is snuggly slid inside sleeve S as the pulling force is released. Flanges 45 and 45*a* act as stoppers preventing any more movement in the direction opposite to the pulling force. Ribs 47 and 47*a* are maintained inserted inside channels Tc and tensioning device 20 is imprisoned within sleeve S thereby immobilizing tubing T. There is no movement in the opposite direction because there is another device 20 installed in the next metal structure M, as seen in FIG. 5.

The use of tensioning device 20 is used in openings in metal structural elements as it may be necessary in order to keep tubing T substantially straight. This preferred embodiment is compatible with sleeves S that are currently being used. There is no need to disassemble tubing T in existing structures using sleeve S since tensioning device 20 can be readily installed.

Figure 1A:
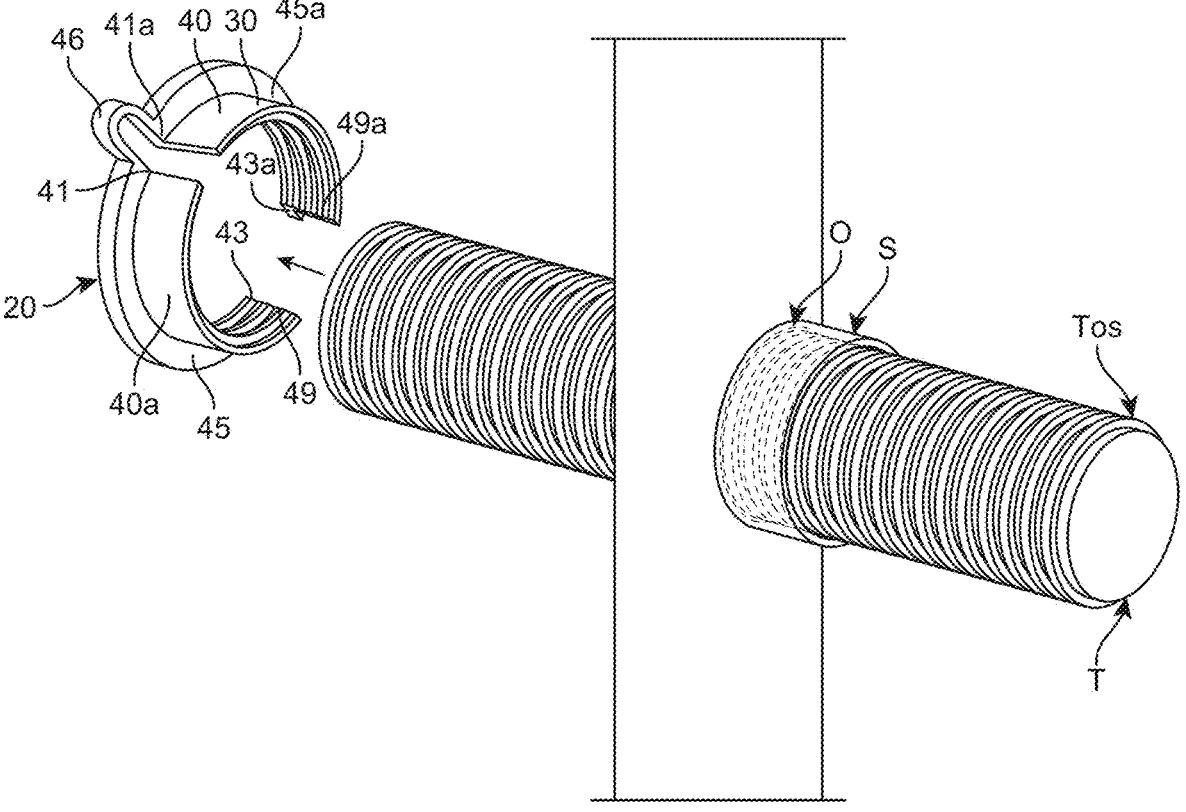
FIG. 1A is similar to FIG. 1 and shows ribbed flexible tubing T being pulled to the left and tensioning device 20 in open disposition ready to embrace tubing T.
Figure 2:
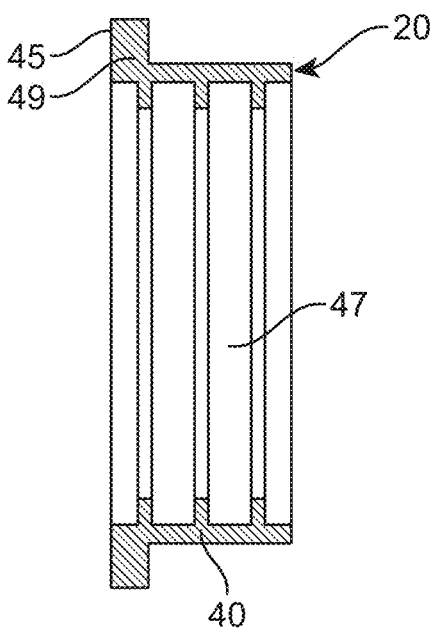
FIG. 2 shows a cross-section view of one of the preferred embodiments for tensioning device 20, illustrating symmetrical sections 40 and 40a with their respective end edges 49 and 49a in an abutment relationship against each other.
Figure 3:
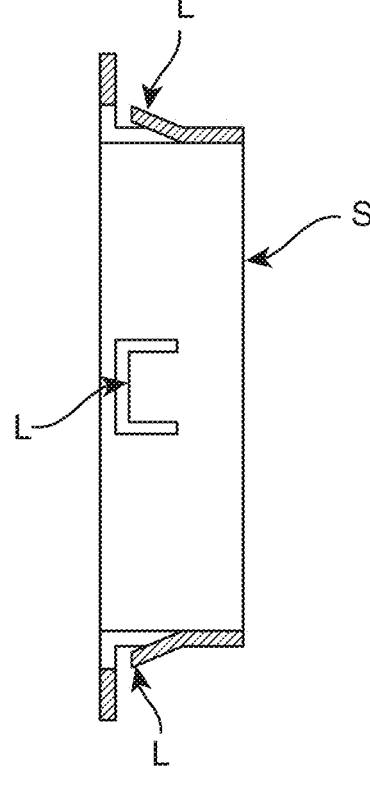
FIG. 3 illustrates a cross-section view of the mating sleeve S that is used in the industry to protect tubing T from abrasion while allowing sufficient clearance for tubing T to freely pass through openings in metal structural members.

An alternate embodiment for tensioning device 120 is shown in FIGS. 1A and 4B wherein slices of flanges 145 and 145*a*, respectively, have been cut off. The dimension of the slices that are cutoff is relatively small and sufficient only to facilitate the resilient separation of sections 140 and 140*a*. The cut off slices are located opposite to distal ends 149 and 149*a* in the area referred to as integral hinge 146.

Another preferred embodiment, shown in FIG. 4C, is referenced with numeral 220 featuring separate sections 240 and 240*a*. This embodiment functions like the other embodiments. Flanges 245 and 245*a* provide the stopper function and internal ribs 247 and 247*a* also engage channels Tc.

To achieve a secure mounting of tubing T, several tensioning devices 20; 120 and/or 220 are used in pairs and in opposite direction, as best seen in FIG. 5. In this manner, flanges 45; 45*a* (and the other variations) prevent the movement of tubing T in both directions.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A tensioning device to be used to secure ribbed flexible and stretchable tubing passing through openings in metal structural members M comprising:

A) a protective sleeve S mounted to said metal structural members M coaxially with said openings and with a ribbed flexible and stretchable tubing T passed therethrough, and said tubing T further including a plurality of outer channels Tc;

B) an elongated flexible cylindrical body 30 having with first and second longitudinally complementary sections 40 and 40*a* and said first and second sections 40 and 40*a* being hingedly joined with first and second distal edges 49 and 49*a*, respectively, that are selectively and resiliently separated from their at rest abutting relationship, thereby defining a resilient separation between said sections 40 and 40*a*, wherein said sections 40 and 40*a* including first and second ends 41; 41*a* and 43; 43*a*, each of said first ends 41 and 41*a* of said sections 40 and 40*a* further including peripheral outwardly extending flanges 45 and 45*a* that contact with said metal structural members M to stop further movement of said body 30 in one direction, said first and second sections 40 and 40*a* each further include at least one internal rib member 47 and 47*a* that are cooperatively received by at least one of said outer channels Tc and said elongated cylindrical body 30 being coaxially mounted within said sleeve S thereby securing said tubing T to said metal structural members M.

2. The device set forth in claim 1 wherein said flanges 45 and 45*a* each have a cutoff slice of a predetermined size to facilitate the resilient separation of the sections 40 and 40*a* allowing the latter to open up sufficiently to embrace said tubing T.

3. The device set forth in claim 1 wherein said sections 40 and 40*a* are separate members.

4. The device set forth in claim 3 further including a hinge member 46 connecting said first and second sections 40 and 40*a* allowing the latter to open up sufficiently to embrace said tubing T.

\* \* \* \* \*